United States Patent [19]
Melendy et al.
[11] 4,249,380
[45] Feb. 10, 1981

[54] TWO STAGE INTENSIFIER

[75] Inventors: Harold A. Melendy, Ashland; Harold V. Hamilton, Bedford, both of Mass.

[73] Assignee: Barry Wright Corporation, Watertown, Mass.

[21] Appl. No.: 60,676

[22] Filed: Jul. 25, 1979

[51] Int. Cl.[3] .............................................. B60T 11/20

[52] U.S. Cl. ........................................ 60/562; 60/577; 60/578; 60/591; 60/593

[58] Field of Search ................. 60/574, 576, 577, 578, 60/591, 593, 562

[56] References Cited

U.S. PATENT DOCUMENTS

| | | | |
|---|---|---|---|
| 2,277,292 | 3/1942 | Bowen | 60/578 |
| 2,341,318 | 2/1944 | Forbes | 60/576 |
| 2,765,625 | 10/1956 | Hart | 60/593 |
| 3,279,381 | 10/1966 | Robertson . | |
| 3,407,601 | 10/1968 | Beck . | |
| 3,625,006 | 12/1971 | Schoenleben . | |
| 3,761,204 | 9/1973 | Pauliukonis | 417/401 |
| 3,787,147 | 1/1974 | McClockin | 60/547 |
| 3,888,552 | 6/1975 | Fontaine | 417/401 |
| 3,945,770 | 3/1976 | Welker | 417/401 |
| 4,076,465 | 2/1978 | Pauliukonis | 417/339 |
| 4,087,210 | 5/1978 | Succhting | 417/401 |
| 4,201,055 | 5/1980 | Bainbridge | 60/578 |

FOREIGN PATENT DOCUMENTS

| | | | |
|---|---|---|---|
| 560678 | 4/1944 | United Kingdom | 60/593 |

*Primary Examiner*—Abraham Hershkovitz
*Attorney, Agent, or Firm*—Milton E. Gilbert

[57] ABSTRACT

A two-stage intensifier system for use in conjunction with a pressure-operable swing clamp or other pressure-operable device for supplying fluid pressure at a relatively low pressure to perform a first operation and thereafter to supply fluid pressure at a higher pressure to perform a second operation.

17 Claims, 6 Drawing Figures

TWO STAGE INTENSIFIER

BACKGROUND OF THE INVENTION

Two-stage intensifiers, sometimes called boosters, are common in the prior art as disclosed, for example, in U.S. Pat. Nos. 3,787,147; 3,761,204; 3,279,381; and 3,625,006. In all of the aforesaid patented structures, the fluid displacement pistons are reciprocated by supplying pressure to both sides thereof which unnecessarily complicates their construction. The device of this invention is designed to eliminate such complexity by employing spring means for returning the fluid displacement pistons to their initial positions with the advantage that the residual low pressure is removed from the reservoir.

SUMMARY OF THE INVENTION

A two-stage fluid pressure intensifier system comprising a low pressure chamber containing at one end a discharge port, a low pressure piston in the low pressure chamber movable therein in a direction to force fluid from a low pressure chamber through the discharge port at low pressure, means for effecting movement of the low pressure piston, said low pressure piston containing a high pressure chamber, a high pressure piston in said high pressure chamber, said high pressure piston extending forwardly from the face of the low pressure piston into the low pressure chamber, being movable with the low pressure piston, movable relative thereto and containing a passage in communication at one end with the low pressure chamber and at its other end with a high pressure chamber, said high pressure piston being operable when moved in engagement with the end of the low pressure chamber to block flow of fluid from the low pressure chamber through the discharge port, place the high pressure chamber in communication with said discharge port and to vent the low pressure chamber and said high pressure piston being movable relative to the low pressure piston as the latter is moved forwardly toward the end of the low pressure chamber to effect discharge of fluid from the high pressure chamber through the discharge port at higher pressure. The means for effecting movement of the low pressure piston is an air-operated piston to which the low and high pressure pistons are connected. The fluid in the system is contained partly in a fluid reservoir and partly in the low and high pressure chambers. The low and high pressure chambers with their pistons are situated within the reservoir together with the air piston. Movement of the air piston is effected by air supplied to one side thereof and effects supply of fluid to the low and high pressure chambers. There is valve means arranged to permit transfer of fluid in the system from the reservoir to the low pressure chamber during retraction of the low pressure piston and to permit transfer of fluid from the low pressure chamber to the reservoir when the pressure therein exceeds a predetermined level. A bypass permits fluid to flow from the low pressure chamber to the reservoir following blocking of the discharge port and continued movement of the low pressure piston relative to the high pressure piston. There is valve means in communication with the discharge port for alternately transmitting fluid from the discharge port to a pressure-operated device when air is supplied to the air piston and returning the transmitted fluid to the reservoir or the low pressure chamber when air supplied to the air piston is vented.

The invention will now be described with reference to the accompanying drawings, wherein.

Figure 1:
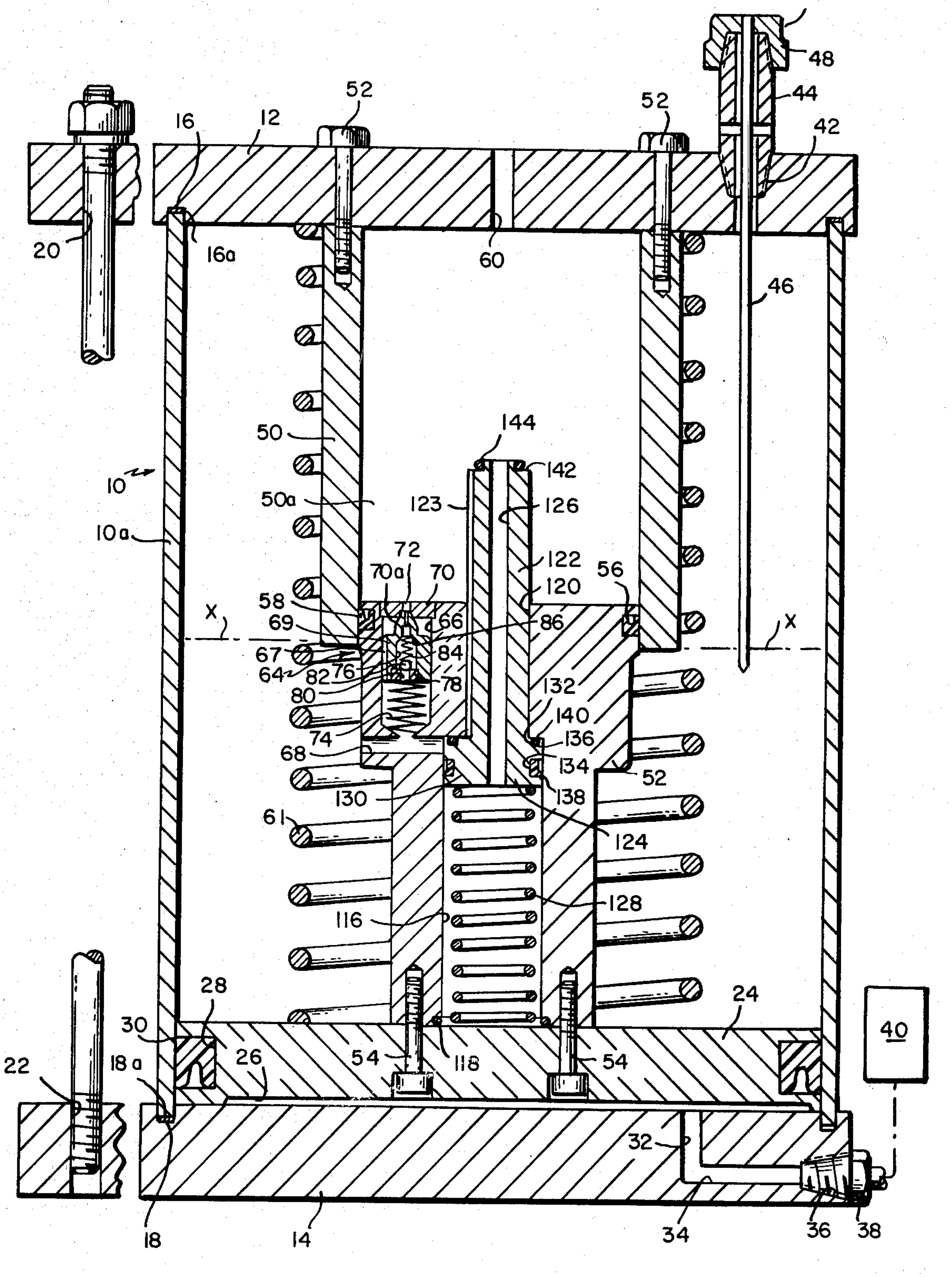
FIG. 1 is a section of the two-stage intensifier in its inoperative position.

Referring to the drawings, FIG. 1, the two-stage intensifier comprises an arrangement of cylinders and pistons operable in a first stage to provide pressures of up to 400 pounds per square inch and in a second stage pressures up to 5000 pounds per square inch. The intensifier is designed to be used in conjunction with a swing clamp which comprises the subject matter of an application about to be filed to supply fluid to the swing clamp at a relatively low pressure to move the swing clamp arm from a retracted position to an operable position and, following such movement of the arm to an operable position, to supply fluid pressure at a higher pressure to effect clamping. It is to be understood that the two-stage intensifier of this invention may be used to supply pressure fluid at different pressures to any fluid-operable device requiring two-pressure operation.

The two-stage intensifier comprises, FIG. 1, a fluid reservoir 10 in the form of a hollow cylinder **10*a* closed at its ends by bottom and top head plates 12 and 14 which is normally filled with fluid to the level X—X. The head plates 12 and 14 respectively contain annular grooves 16 and 18 for receiving the opposite ends of the cylinder 10*a* and holes 20,22 for receiving bolts by means of which the head plates are bolted together in leaktight engagement with the ends of the cylinder. Gaskets 16*a*,18*a* are interposed between bottoms of the grooves 16 and 18 and the ends of the cylinder to insure leaktightness. Within the reservoir 10, there is mounted at the lower end an air piston 24, the lower face of which is provided with a circular recess 26 and the peripheral surface of which is provided with an annular groove 28 in which there is mounted a sealing ring 30. The bottom head plate 14 contains a vertical passage 32 positioned to be in communication with the recess 26 at the lower side of the piston 24 and a horizontal passage 34 extending laterally from the passage 32 through the edge of the bottom head plate which has at its outer end a conical portion 36 for receiving the nipple 38 of an air valve 40 by means of which air pressure is supplied to the lower end of the reservoir 10 through the bottom head plate to the recess 26 at the lower side of the air piston 24 to move the latter from the lower end of the reservoir toward the upper end. The reservoir 10 above the piston 24 defines a chamber for receiving fluid means which comprises the operating fluid for operation of the swing clamp referred to above. The top head plate 12 contains a threaded opening 42 in which there is fixed a sleeve 44 for receiving a dip stick 46** to enable easily determining the level of the fluid in the reservoir 10. The upper end of the dip stick is provided with a cap 48 for closing the upper end of the sleeve 44 and for suspending the dip stick in a position to enable easily removing it for inspection.

A low pressure cylinder 50 is fastened at one end to the inner side of the top head plate 12 by bolts 52 in concentric relation to the reservoir 10 and defines in conjunction with the inner side of the top head plate 12, a low pressure chamber 50*a* closed at its upper end and open at its lower end. The open lower end of the low pressure chamber faces the air piston 24. A low pressure piston 52 is mounted to the inner side of the air piston 24 by means of bolts 54 in concentric relation with the low pressure chamber and with a portion extending into the open end of the low pressure chamber. The inwardly-extending portion of the low pressure piston contains an annular groove 56 peripherally thereof for receiving a sealing ring 58. The low pressure piston 52 is moved by the air piston 24 through the open end of the low pressure chamber toward the closed upper end of the low pressure chamber and the latter contains at its closed end a discharge port 60 through which fluid in the low pressure chamber ahead of the face of the low pressure piston will be forced by movement of the low pressure piston toward the closed end of the low pressure chamber. In the absence of pressure, the low pressure piston is held displaced from the low pressure chamber by a coil spring 61 disposed in the reservoir about the low pressure chamber with one end bearing against the inner side of the air piston 24 and the other end bearing against the inner side of the top head plate 12.

A valve assembly 62*a* or 62*b* is secured to the upper side of the top head plate 12 over the port 60 for controlling the flow of pressure fluid to the swing clamp referred to above to on the one hand supply pressure fluid thereto and on the other to return the pressure fluid to the low pressure chamber 50*a* or to the reservoir 10, respectively, as will be described hereinafter, or to any other pressure-operable device where it is desirable to provide for low and high pressure operation.

The low pressure piston 52 is provided, as shown in FIG. 1, with valve means 64 which function on the one hand to permit transfer of fluid from the reservoir to the low pressure chamber and on the other hand to permit transfer of fluid from the low pressure chamber to the reservoir. The valve means 64, FIG. 1, comprises a passage 66 perpendicular to the end face of the low pressure piston with one end in communication with the low pressure chamber and the other end in communication with a transverse passage 68, one end of which is open through the side of the low pressure piston and is in communication with the reservoir 10 throughout movement of the low pressure piston in the low pressure chamber. A plug 70 containing a port 72 is fixed in the end of the passage 66 at the face of the low pressure piston and a valve member 69 provided with a tapered end 70*a* is mounted in the passage below the plug and held with its tapered end 70*a* engaged with the port 72 by a spring 74 disposed in the passage between the lower end of the valve member and the lower end of the passage. The spring 74 is designed to yield at a predetermined pressure to permit the transfer of fluid from the low pressure chamber through port 72 around flat 67 on 69 (see FIG. 2) and through port 68 into reservoir. The valve member 68 contains an axial passage 76, the upper end of which extends through the tapered end. A plug 78 containing a port 80 is fixed in the lower end of the axial passage and a ball element 82 is held against the port 80 by a spring 84 disposed in the axial passage between the ball element and a shoulder 86 internally of the passage at its upper end. The spring 84 is chosen to permit the ball to yield in a direction to uncover the port when the pressure in the reservoir 10 exceeds that of the pressure in the low pressure cylinder.

Figure 4:
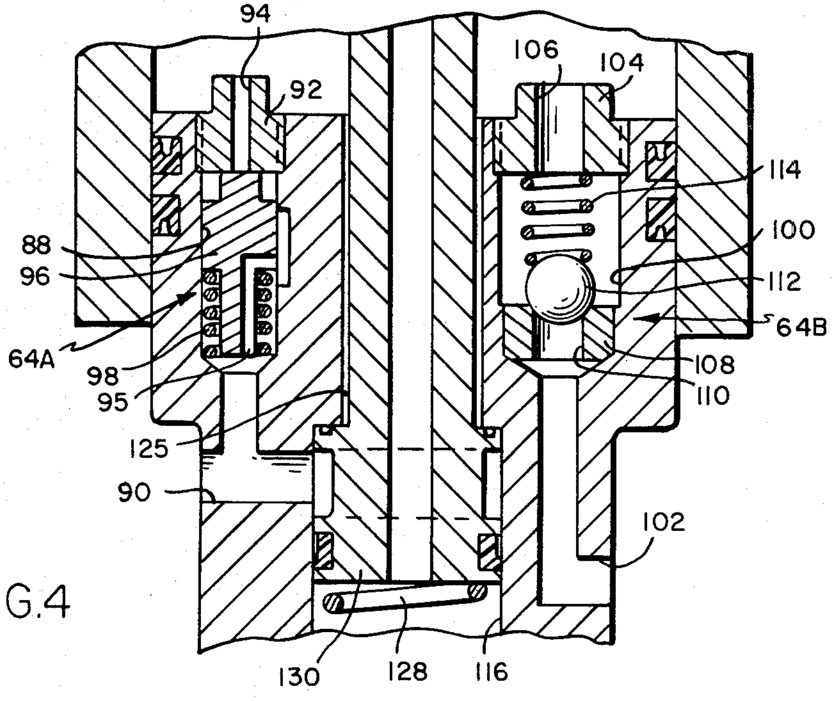
FIG. 4 is a fragmentary section showing the preferred arrangement of the valve means in the low pressure position.

Alternatively, the valve means in the low pressure piston 52 for controlling transfer of the fluid from the reservoir 10 to the low pressure chamber and vice-versa may be replaced by two separate valve assemblies 64*a*,64*b* as shown in FIG. 4. The valve assembly 64*a* comprises a passage 88 perpendicular to the end face of the low pressure piston in communication at its upper end with the low pressure chamber and at its lower end with a transverse passage 90, one end of which is open through the side of the piston into the reservoir 10 and is in continuous communication therewith throughout movement of the low pressure piston. A plug 92 containing a port 94 is fixed in the upper end of the passage and a valve element 96 is supported in blocking engagement with the port by a spring 98 disposed in the passage between the bottom side of the valve element and the lower end of the passage. The spring 98 is chosen to yield at a predetermined pressure to permit fluid in the low pressure chamber to pass through a passage 95 and passage 90 to the reservoir 10. The other of the valve means 64*b* comprises a passage 100 perpendicular to the end face of the low pressure piston, one end of which opens into the low pressure chamber and the other end of which is connected to a transverse passage 102, one end of which opens into the reservoir 10 and is in communication with the reservoir 10 throughout movement of the piston. A plug 104 containing a port 106 is fixed in the upper end of the passage and a seat 108 containing a port 110 is formed in the bottom of the passage. A ball element 112 in the passage is held against the seat by a spring 114 and the spring is chosen so that when the pressure in the reservoir 10 exceeds that in the low pressure chamber 50, the ball element will be displaced so as to allow the fluid to flow from the reservoir 10 into the low pressure chamber.

The low pressure piston 52 contains an axial hole which constitutes a high pressure chamber 116, one end of which is constituted by the inner side of the air piston 24. A sealing ring 118 is provided at the junction of the low pressure piston with the air piston to seal the high pressure chamber 116 at that end. At the other end, there is an axial hole 120 of smaller diameter which extends through the face of the low pressure piston and a high pressure piston 122 is mounted in the hole 120 with one end 124 extending into the high pressure chamber and the other end extending from the face of the low pressure piston toward the closed end of the low pressure chamber. The high pressure piston 122 contains an axial passage 126 which is in communication with one end of the high pressure chamber 116 and at the other end with the low pressure chamber. A coiled spring 128 is disposed in the high pressure chamber 116 with one end bearing against the closed end of the high pressure chamber and the other end against a head 130 at the lower end of the high pressure piston which holds the head against a shoulder 132 at the junction of the high pressure chamber within the hole 120, with the upper end of the piston extending from the face of the high pressure piston with the low pressure chamber. The head 130 contains peripherally thereof a groove 134 and in its upper face a groove 136 in which there are positioned sealing rings 138 and 140. At the upper end of the high pressure piston, there is a circumferential groove 142 containing a sealing ring 144.

Figure 2:
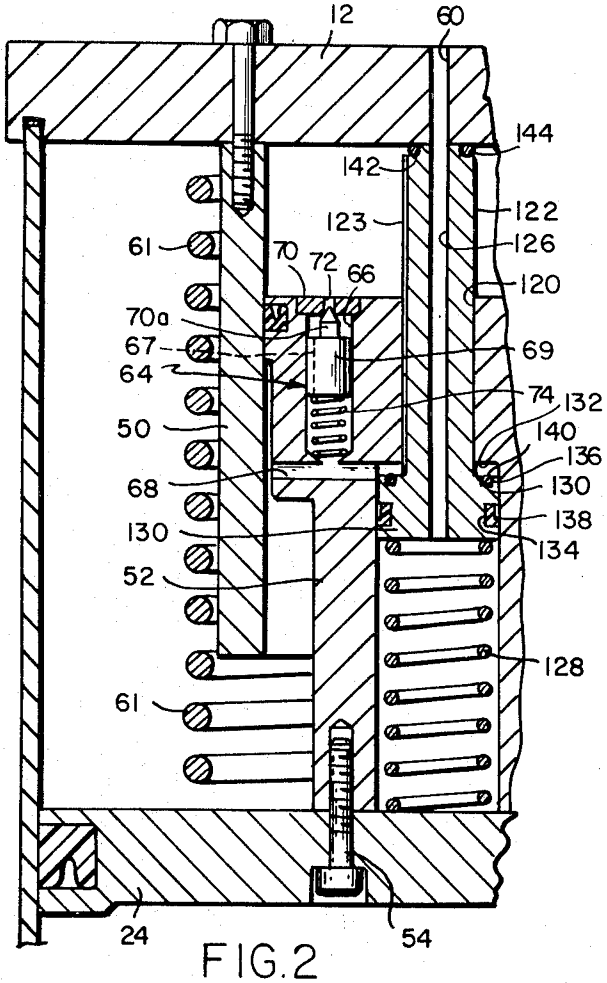
FIG. 2 is a fragmentary section showing the high pressure stage of its operation.
Figure 3:
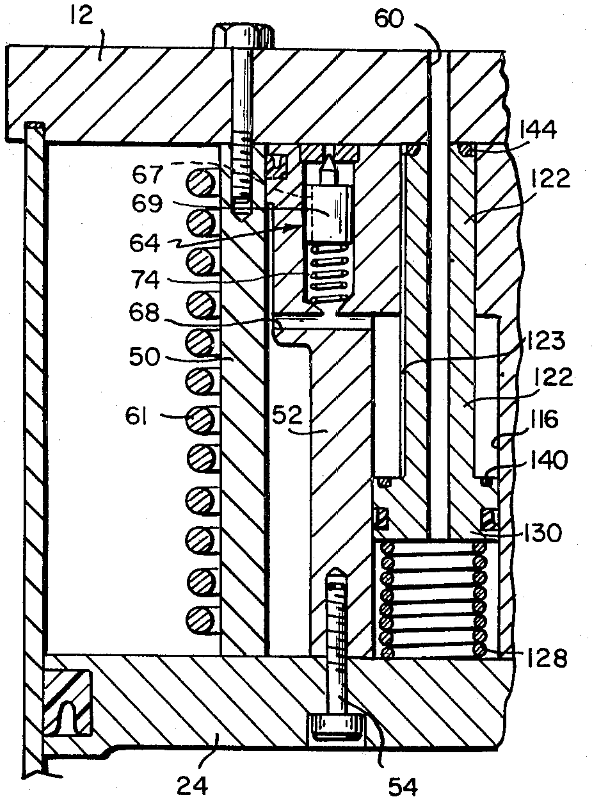
FIG. 3 is a fragmentary section showing the terminal positions of the low and high pressure pistons.

In the form of the invention shown in FIGS. 1, 2 and 3, the high pressure piston contains axially thereof a slot 123 which constitutes a bypass when the high pressure piston is displaced so that when the head 130 is disengaged from sealing ring 140, fluid is permitted to flow from the low pressure chamber by way of the slot 123 and passage 68 to the reservoir. In the form shown in FIG. 4, the diameter of the high pressure piston within the hole 120 is of smaller diameter so as to provide a passage 125 for transfer of fluid from the low pressure chamber to the reservoir through the passage 90 when the head 130 of the piston is displaced downwardly.

Figure 5:
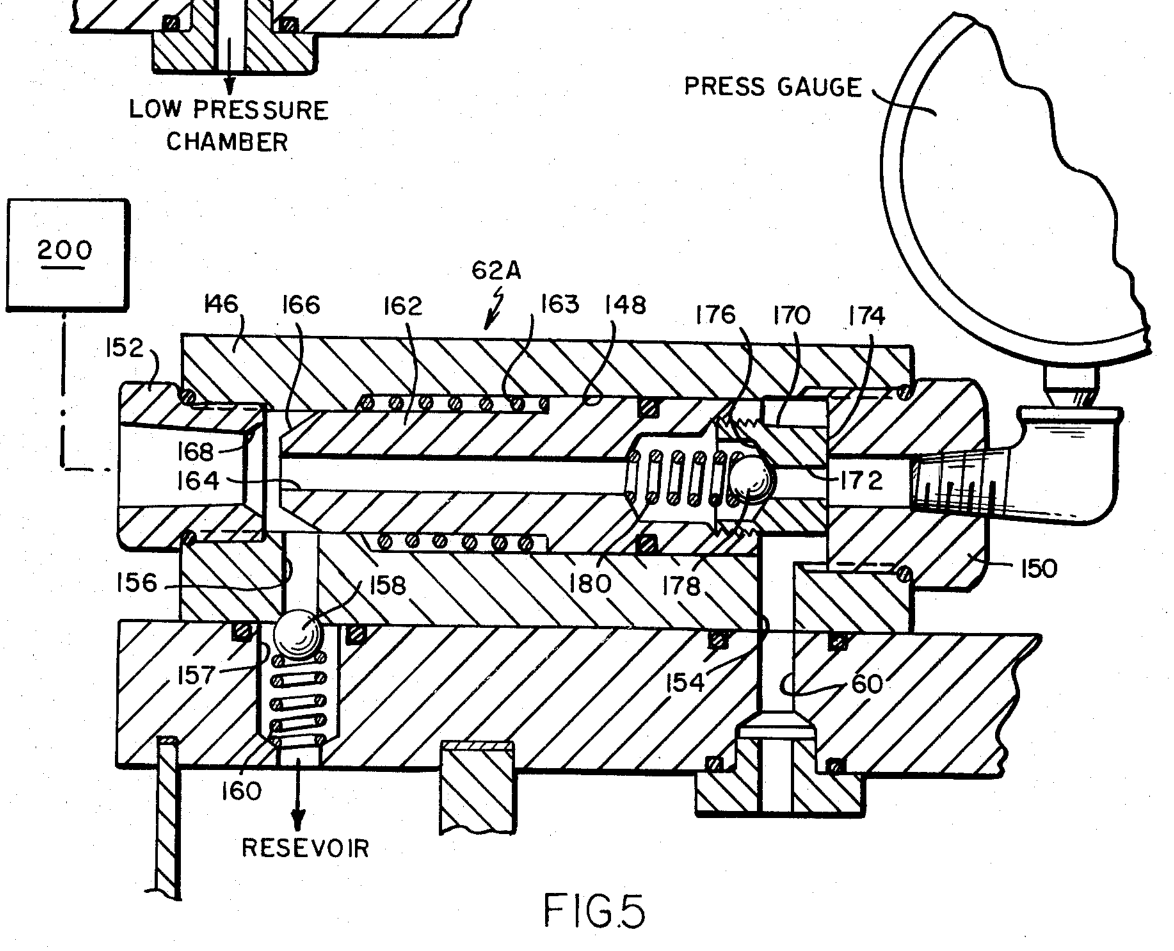
FIG. 5 is a section of one form of valve means for controlling the flow of pressure fluid to a pressure-operated device and returning it to the reservoir.

As previously mentioned, there is a valve assembly 62*a* mounted to the top head plate 12 as shown in FIG. 5 which comprises a valve body 146 containing a horizontal passage 148, the opposite ends of which are threaded and into which are screwed threaded coupling elements 150 and 152. The wall of the valve body contains at one end a passage 154 which is in communication with the discharge port 60 and at its other end a passage 156 which is in communication with a return port 157 in the top head within which there is a ball element 158 and spring 160 arranged so that the spring holds the ball element closed to function as a check valve to prevent escape of fluid from the downstream portion of the system in the unpressurized mode, but to permit fluid to be returned to the reservoir 10 in the pressurized mode. A piston valve element 162 containing an axial passage 164 is supported in the horizontal passage 148 and has at one end a conical portion 166 adapted to be seated against a conical recess 168 at the inner end of the coupling element 152. At the opposite end of the piston valve there is a plug 170 containing a port 172 which provides an annular surface 174 for engagement with the inner side of the coupling 150 and a conical seat 176. A ball element 178 is held against the conical seat by a spring 180.

In operation, air pressure is supplied by the valve 40 to the chamber formed in part by the recess 26 at the lower or back side of the air piston 24 so as to move the air piston 24 toward the opposite side of the reservoir. Such movement moves the low pressure piston 52 into the low pressure chamber 50*a* toward the closed end thereof. As the air piston 24 is moved upwardly in the reservoir 10, the fluid level X—X is raised upwardly. Fluid in the low pressure chamber 50*a* is moved through the discharge port to pressurize the downstream portion of the system until sufficient pressure builds up to cause the unseating of the valve 69 from the plug 70, at which time the fluid will flow through port 72, passage defined by flat 67 and surface 66 and transverse passage 68 to the reservoir 10.

Discharge fluid exiting from port 60 shifts the piston valve 162 (FIG. 5) from right to left, opens the ball element 178 and seats the tapered end against the seat 168 so that the fluid flows through the axial passage 164 in the piston valve and through the coupling 152 to the swing clamp or other pressure device 200 to effect its operation to supply pressure thereto at a relatively low pressure. At a predetermined position of the low pressure piston 52 (FIGS. 1 and 3) in the reservoir chamber 50*a*, the end of the high pressure piston 122 blocks flow of fluid from the low pressure chamber 50*a* through the port 60. As the low pressure piston 52 continues to advance into the low pressure chamber 50*a*, as shown in FIG. 3, the fluid in the low pressure chamber 50*a* is permitted to return through the bypass 123 and passage 68 by unseating of the head 130 at the lower end of the high pressure piston from the sealing ring 140. As the displacement of the high pressure piston 122 takes place, it forces the fluid from the chamber 116 through the discharge port 60 at high pressure for supplying high pressure operating fluid to the swing clamp or other pressure-operated device 200 connected thereto. The low and high pressure pistons are restored to their initial positions by venting the valve 40, thus reducing the pressure against the air piston 24, whereupon the piston valve 162 will be displaced from left to right by the spring 163 and the operating fluid returned through the passage 157 to the reservoir 10.

Figure 6:
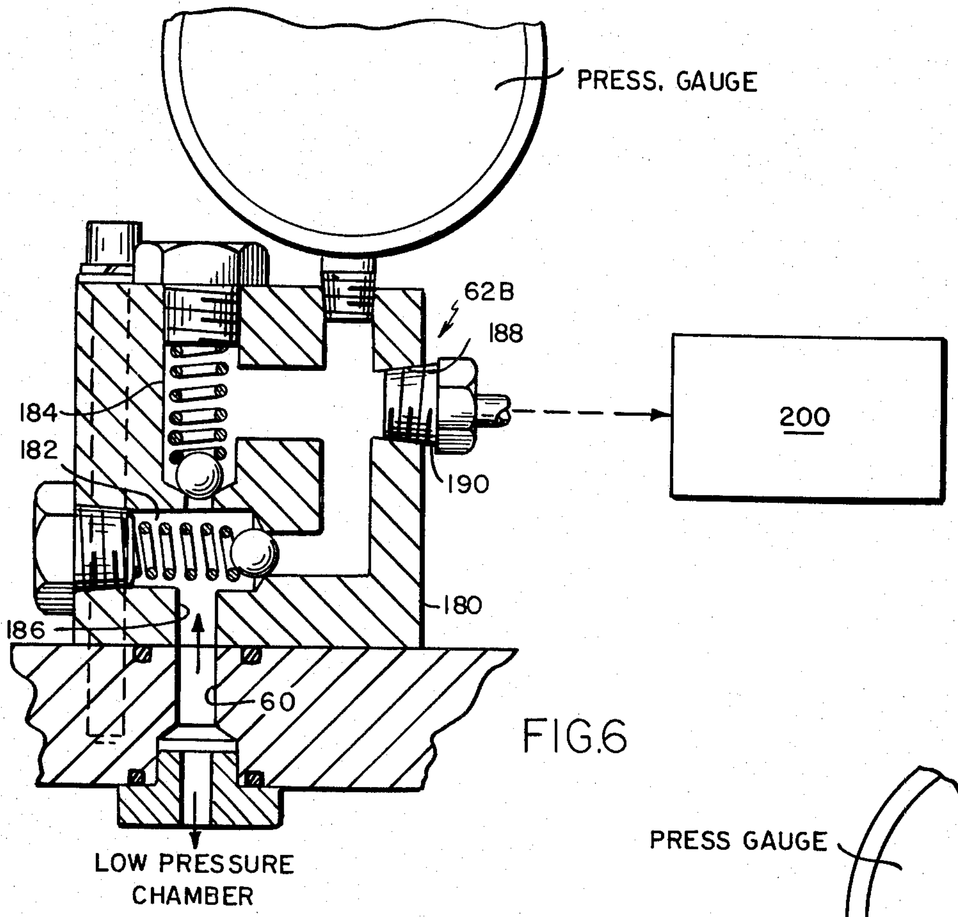
FIG. 6 is a section of another form of valve means for controlling the flow of pressure fluid to a pressure-operated device and returning it to the low pressure chamber.

In another form, the valve means 62*b* (FIG. 6) comprises a valve body 180 containing ball check valves 182,184, a port 186 providing communication to and from the port 60, and a port 188 containing a threaded coupling element 190 for connecting the valve body to the apparatus 200 to which the pressure fluid is being applied. The check valves are arranged so that pressure fluid delivered to the valve body through the port 186 will flow through the check valve 184 to the port 188 and return flow from the serviced apparatus will flow through the check valve 182 and port 186 back into the low pressure chamber 50*a*. On the downstroke of the air piston 24, a partial vacuum is created in the chamber 50*a*, causing the unseating of the check valve 82 (FIG. 1) or 112 (FIG. 4) to allow flow of fluid from the reservoir 10 into the chamber 50*a*. Spring means 61 continues moving the air piston 24 to its initial bottom position against the head plate 14, whereupon a new cycle is commenced when fluid pressure is again introduced through the passage 32.

It should be understood that the present disclosure is for the purpose of illustration only and includes all modifications or improvements which fall within the scope of the appended claims.

What is claimed is:

1. A two-stage pressure intensifier system comprising a low pressure chamber containing at one end a discharge port, a low pressure piston in the low pressure chamber movable therein in a direction to force fluid from the low pressure chamber through the discharge port, means for moving said low pressure piston, said low pressure piston containing a high pressure chamber, a high pressure piston in said high pressure chamber, said high pressure piston extending forwardly from the face of the low pressure piston into the low pressure chamber and being movable within and relative to the low pressure piston, a fluid reservoir, valve means associated with the low pressure piston operable on the one hand to permit pressure fluid to flow from the reservoir to the low pressure chamber and on the other hand to permit pressure fluid to flow from the low pressure chamber to the reservoir, said high pressure piston being operable when moved into engagement with the end of the low pressure chamber to block flow of fluid from the low pressure chamber through the discharge port and place the high pressure chamber in communication with the discharge port and wherein movement of the high pressure piston relative to the low pressure piston as the latter is moved forwardly toward the end of the low pressure chamber permits flow of fluid from the low pressure chamber to the reservoir and discharges fluid from the high pressure chamber through the discharge port at high pressure.

2. Apparatus according to claim 1 wherein the means for moving the low pressure piston is an air-operated piston to which the low pressure piston is connected.

3. A two-stage intensifier comprising a system of concentrically-arranged cylinders defining chambers containing pistons, one of said chambers comprising a fluid reservoir containing an air piston, another a low pressure chamber containing a low pressure piston and the third a high pressure chamber containing a high pressure piston, a discharge port at one end of the low pressure chamber through which fluid is discharged by movement of the low pressure piston in the low pressure chamber, said high pressure piston being movable into blocking position with the discharge port in the low pressure chamber to prevent fluid communication between the low pressure chamber and the port when said low pressure piston reaches a predetermined position in the low pressure chamber and said high pressure piston containing an axial passage which is in communication with the high pressure chamber, said air-actuated piston being operable to move the low pressure piston in the low pressure chamber and said high pressure piston when brought into blocking position, discharging fluid from the high pressure chamber through the discharge port at a high pressure and valve means associated with the low and high pressure pistons for at times permitting transfer of fluid from the low pressure chamber to the reservoir and at other times from the reservoir to the low pressure chamber.

4. Apparatus according to claim 3 wherein the valve means associated with the high pressure piston is bypass means for permitting flow of fluid from the low pressure chamber to the reservoir following blocking of the discharge port and continued movement of the low pressure piston toward the end of its stroke.

5. A two-stage intensifier comprising a fluid system embodying a fluid reservoir, an air piston in said reservoir movable therein from one end toward the other, a low pressure chamber in the reservoir in concentric relation with the reservoir and at said other end of the reservoir, said low pressure chamber being open at the end confronting the air piston, a low pressure piston mounted to the air piston and movable through the open end of the low pressure chamber from the open end toward the closed end, said low pressure chamber containing a discharge port through which fluid is discharged from the low pressure chamber at a low pressure by movement of the low pressure piston toward the closed end of the low pressure chamber, said low pressure piston containing a high pressure chamber, a high pressure piston supported in the high pressure chamber with an end extending beyond the face of the low pressure piston toward the closed end of the low pressure chamber such that as the low pressure piston is moved toward the closed end of the low pressure chamber, the high pressure piston will be moved into engagement with the closed end of the low pressure chamber and cover the port therein to prevent fluid communication between the low pressure chamber and the port, said high pressure piston having an axial passage in communication with the high pressure chamber which is in alignment with the port such that when brought into engagement with the end of the low pressure chamber, the high pressure chamber will be placed in communication with the port, said high pressure piston being movable relative to the low pressure piston by movement of the low pressure piston in the low pressure chamber to effect discharge of fluid from the high pressure chamber at a high pressure through the port, valve means associated with the low pressure piston which at times permits fluid to flow from the reservoir to the low pressure chamber and at other times to flow from the low pressure chamber to the reservoir and valve means associated with the high pressure piston which permits fluid to flow from the low pressure chamber to the reservoir when the high pressure piston is moved into blocking engagement with the discharge port.

6. A two-stage intensifier comprising a fluid system embodying a reservoir closed at its ends, an air piston in the reservoir, spring means yieldably holding the air piston against one end of the reservoir, means defining a fluid passage in one of the closed ends for supplying fluid pressure to one side of the air piston to move it toward the other end of the reservoir, a low pressure chamber in the reservoir concentric with the reservoir, said low pressure chamber extending from said other end of the reservoir toward the one end and being open-ended at the end opposite the air piston, a low pressure piston fixed to and extending from the air piston into the open end of the low pressure chamber, said low pressure piston being movable by the air piston toward the closed end of the low pressure chamber, a port in the closed end of the low pressure chamber through which fluid in the low pressure chamber is discharged at low pressure by movement of the low pressure piston toward the closed end of the low pressure chamber, valve means in the low pressure piston displaceable by a predetermined pressure in the low pressure chamber to permit fluid to flow from the low pressure chamber into the reservoir and displaceable by a negative pressure in the low pressure chamber to permit flow from the reservoir into the low pressure chamber, said low pressure piston containing a high pressure chamber, a high pressure piston in said high pressure chamber movable by movement of the low pressure piston toward the closed end of the low pressure chamber into blocking engagement with the port to prevent fluid communication between the low pressure chamber and the port, said high pressure piston being movable relative to the low pressure piston to effect discharge of fluid from the high pressure chamber through the port, and valve means associated with the high pressure piston for permitting fluid to flow from the low pressure chamber to the reservoir following blocking of the discharge port.

7. A two-stage intensifier comprising a closed fluid pressure system embodying a reservoir closed at its ends, an air piston in the reservoir at one end, a coil spring in said reservoir bearing at one end against the inner side of the air piston and at its other end with the other end of the reservoir so as to yieldably hold the air piston at one end of the reservoir, a cylinder secured at one end to the opposite end of the reservoir in concentric relation thereto which, in conjunction with the other end of the reservoir, defines a low pressure chamber within the reservoir open at the end opposite the air piston, a low pressure piston secured to the inner side of the air piston and extening therefrom into the open end of the low pressure chamber, said low pressure piston being movable toward the closed end of the low pressure chamber by movement of the air piston toward said other end of the reservoir, a discharge port in the closed end of the low pressure chamber through which fluid in the low pressure chamber is discharged by movement of the low pressure piston toward the closed end of the low pressure chamber, valve means associated with the low pressure piston operable on the one hand to permit flow of fluid from the low pressure chamber to the reservoir and on the other hand to permit flow of fluid from the reservoir to the low pressure chamber, said low pressure piston contain an axial opening defining a high pressure chamber, a high pressure piston mounted in said axial opening with a portion in the high pressure chamber and a portion extending from the face of the low pressure piston toward the closed end of the low pressure cylinder, spring means in the high pressure chamber yieldably holding the high pressure piston extended, said high pressure piston being movable into engagement with the closed end of the low pressure chamber to prevent fluid communication between the low pressure chamber and the port, said high pressure piston containing an axial passage which, when the high pressure piston is moved into engagement with the closed end of the low pressure cylinder, places the high pressure chamber in communication with the port and said high pressure piston being movable relative to the low pressure piston by movement of the low pressure piston toward the closed end of the low pressure chamber to discharge fluid from the high pressure chamber through the port, and valve means associated with the high pressure piston for permitting fluid fow from the low pressure chamber to the reservoir following blocking of the discharge port.

8. Apparatus according to claim 1 wherein the valve means for permitting flow of fluid pressure from the low pressure chamber comprises a passage in the low pressure piston, one end of which is in communication with the face of the low pressure piston and the other end of which is in communication through a side of the low pressure piston with the reservoir and a one-way check valve in said passage displaceable at a predetermined pressure to permit fluid flow from the low pressure chamber to the reservoir.

9. Apparatus according to claim 1 wherein the valve means associated with the low pressure piston comprises a primary valve arranged to permit fluid to pass from the reservoir into the low pressure chamber during retraction of the low pressure piston and a secondary valve arranged to permit flow of the fluid from the low pressure chamber to the reservoir when the pressure in the low pressure chamber reaches a predetermined level.

10. Apparatus according to claim 2 wherein there is spring means arranged in the reservoir opposing movement of the air piston and operable when the air pressure supplied to the air piston is vented to effect refilling of the low pressure chamber.

11. Apparatus according to claim 10 wherein there is spring means supporting the high pressure piston distended relative to the low pressure piston yieldable to permit the high pressure piston to be forced into its chamber to displace the fluid therein from said high pressure chamber and operable to restore the high pressure piston to its distended position when the low pressure piston is retracted from the low pressure chamber.

12. Apparatus according to claim 1 wherein the valve means associated with the low pressure piston comprises passages in communication at their ends with the reservoir and low pressure chamber and check valve means in said passages, one of which permits transfer of fluid from the reservoir to the low pressure chamber, but not vice-versa, and the other of which permits transfer of fluid from the low pressure chamber to the reservoir, but not vice-versa.

13. Apparatus according to claim 1 wherein there is valve means at the top of the reservoir arranged to permit return of fluid to the reservoir.

14. Apparatus according to claim 1 comprising a valve assembly attached to the top of the reservoir in communication with the discharge port containing a valve movable therein in one direction to permit the pressure of fluid discharged through the discharge port to be supplied to fluid operable means and to block return of the fluid from the fluid operable means to the reservoir and in another position to block discharge of the fluid from the discharge port and permit return of the fluid to the reservoir.

15. Apparatus according to claim 1 wherein a valve assembly is disposed in said discharge port, said valve assembly comprising a valve housing, one end of which is in communication with the discharge port and the other end of which is in communication with the low pressure chamber and valve means operable in one position to prevent flow of fluid from the discharge port to the fluid operable means and in another position to permit return of the fluid from the fluid operable means to the low pressure chamber.

16. A two-stage pressure intensifier system comprising a low pressure chamber containing at one end a discharge port, a low pressure piston in the low pressure chamber movable in a direction to force fluid from the low pressure chamber through the discharge port, means for moving said low pressure piston, said low pressure piston containing a high pressure chamber, a high pressure piston in said high pressure chamber, said high pressure piston extending forwardly from the face of the low pressure piston into the low pressure chamber and being movable relative to the low pressure piston, means associated with the low pressure piston operable on the one hand to permit pressure fluid to enter the low pressure chamber and on the other hand to permit pressure fluid to leave the low pressure chamber, said high pressure piston being movable when moved into engagement with the end of the low pressure chamber to block the flow of fluid from the low pressure chamber through the discharge port and place the high pressure chamber in communication with the discharge port and wherein movement of the high pressure piston relative to the low pressure piston as the latter is moved forwardly toward the end of the low pressure chamber permits pressure fluid to leave the low pressure chamber and discharges pressure fluid from the high pressure chamber through the discharge port at a high pressure.

17. A two-stage pressure intensifier system comprising a low pressure chamber containing at one end a discharge port, a low pressure piston in the low pressure chamber movable therein in a direction to force fluid from the low pressure chamber through the discharge port, means for moving said low pressure piston, a high pressure chamber movable with the low pressure piston, a high pressure piston in said high pressure chamber extending forwardly from the high pressure chamber and being movable with and relative to the low pressure piston, valve means associated with the low pressure piston operable on the one hand to permit pressure fluid to enter the low pressure chamber and on the other hand to permit pressure fluid to leave the low pressure chamber, said high pressure piston being movable into engagement with the end of the low pressure chamber to block the flow of fluid from the low pressure chamber through the discharge port and place the high pressure chamber in communication with the discharge port and wherein movement of the high pressure piston relative to the low pressure piston as the latter is moved forwardly toward the end of the low pressure chamber permits pressure fluid to leave the low pressure chamber and discharges fluid from the high pressure chamber through the discharge port.

* * * * *